(12) United States Patent
Takahashi et al.

(10) Patent No.: US 7,988,363 B2
(45) Date of Patent: Aug. 2, 2011

(54) BEARING WITH ROTATION DETECTION DEVICE

(75) Inventors: Toru Takahashi, Iwata (JP); Yoshitaka Nagano, Iwata (JP); Hiroshi Isobe, Iwata (JP); Takashi Koike, Iwata (JP)

(73) Assignee: NTN Corporation, Osaka (JP)

( * ) Notice: Subject to any disclaimer, the term of this patent is extended or adjusted under 35 U.S.C. 154(b) by 855 days.

(21) Appl. No.: 11/884,892

(22) PCT Filed: Feb. 8, 2006

(86) PCT No.: PCT/JP2006/002193
§ 371 (c)(1),
(2), (4) Date: Aug. 22, 2007

(87) PCT Pub. No.: WO2006/090588
PCT Pub. Date: Aug. 31, 2006

(65) Prior Publication Data
US 2009/0123098 A1      May 14, 2009

(30) Foreign Application Priority Data

Feb. 22, 2005   (JP) .................................. 2005-045080

(51) Int. Cl.
*F16C 32/04* (2006.01)
*G01P 3/44* (2006.01)

(52) U.S. Cl. .......................... 384/446; 384/490; 324/173
(58) Field of Classification Search .................. 384/446, 384/448, 490, 494, 548, 482, 485; 324/173–174, 324/207, 207.25
See application file for complete search history.

(56) References Cited

U.S. PATENT DOCUMENTS

| | | | | |
|---|---|---|---|---|
| 3,530,317 A | * | 9/1970 | Lang | 324/207.25 |
| 3,616,687 A | * | 11/1971 | Wignall | 324/174 |
| 3,944,305 A | * | 3/1976 | Asberg | 384/482 |
| 4,688,951 A | * | 8/1987 | Guers | 384/446 |
| 4,978,234 A | * | 12/1990 | Ouchi | 384/448 |
| 4,988,219 A | * | 1/1991 | Peilloud | 384/448 |
| 5,637,997 A | * | 6/1997 | Hore et al. | 324/207.25 |
| 6,012,986 A | * | 1/2000 | Guimbretiere | 384/544 |
| 6,217,220 B1 | * | 4/2001 | Ohkuma et al. | 384/489 |
| 6,352,370 B1 | * | 3/2002 | Nicot | 384/448 |
| 6,363,799 B1 | * | 4/2002 | Toda et al. | 384/448 |
| 6,545,457 B2 | * | 4/2003 | Goto et al. | 324/251 |

(Continued)

FOREIGN PATENT DOCUMENTS
DE        29609042 U1     *    6/1996
(Continued)

OTHER PUBLICATIONS

Chinese Office Action issued on Jun. 5, 2009 in corresponding Chinese Patent Application 200680004888X.
International Search Report of International Published Application No. PCT/JP2006/302193 (mailed May 16, 2006).

(Continued)

*Primary Examiner* — Marcus Charles

(57) ABSTRACT

To downsize a bearing assembly with a rotation detection device, a magnetic generating element (2) having a directionality about a rotation axis O is provided on an inner race (21) side of the bearing assembly (20). A rotation sensor (3) capable of detecting a magnetism of the magnetic generating element (2) and outputting information descriptive of rotation or angle is fitted to an outer race (22) side in alignment with a bearing axis. The magnetic generating element (2) is fixed to a fixing member, for example, a rotary shaft (10) that is fixed to an inner diametric side of the inner race (21) of the bearing assembly (20).

10 Claims, 12 Drawing Sheets

U.S. PATENT DOCUMENTS

| | | | |
|---|---|---|---|
| 6,679,633 B2 * | 1/2004 | Chambert | 324/207.25 |
| 6,771,065 B2 * | 8/2004 | Pointer | 324/207.2 |
| 6,984,072 B2 * | 1/2006 | Landrieve | 324/174 |
| 2004/0046547 A1 | 3/2004 | Landrieve | |
| 2004/0150392 A1 | 8/2004 | Nakano et al. | |

FOREIGN PATENT DOCUMENTS

| | | | | |
|---|---|---|---|---|
| EP | 137270 | A | * | 4/1985 |
| FR | 2 816 047 | | | 5/2002 |
| JP | 11069735 | A | * | 3/1999 |
| JP | 11146593 | A | * | 5/1999 |
| JP | 2001178109 | A | * | 6/2001 |
| JP | 2002272033 | A | * | 9/2002 |
| JP | 2002-541417 | | | 12/2002 |
| JP | 2003-97581 | | | 4/2003 |
| JP | 2003-307229 | | | 10/2003 |
| JP | 2003-307435 | | | 10/2003 |
| JP | 2004-37133 | | | 2/2004 |
| JP | 2004-513335 | | | 4/2004 |
| WO | WO 0237058 | | | 4/2004 |

OTHER PUBLICATIONS

PCT Notification of Transmittal of Translation of the International Preliminary Report on Patentability (Chapter 1 or Chapter II of the Patent Cooperation Treaty) for PCT Application No. PCT/JP2006/302193 (2 pages).

Written Opinion of the International Searching Authority for PCT Application No. PCT/JP2006/302193 (4 pages).

Chinese Office Action mailed Feb. 12, 2010 issued in corresponding Chinese Patent Application 200680004888X.

Japanese Office Action issued Dec. 21, 2010 in corresponding Japanese Patent Application 2005-045080.

Japanese Office Action issued Oct. 5, 2010 in corresponding Japanese Patent Application 2005-045080.

* cited by examiner

BEARING WITH ROTATION DETECTION DEVICE

CROSS REFERENCE TO RELATED APPLICATIONS

This application is based on and claims priority to International Application No. PCT/JP2006/302193 filed Feb. 8, 2006, and Japanese application No. 2005-045080 filed Feb. 22, 2005, which is incorporated by reference in its entirety into this application.

BACKGROUND OF THE INVENTION

1. Field of the Invention

The present invention relates to a bearing assembly with a rotation detection device that can be used for the detection of rotations occurring in various machines and equipments, for example, the detection of rotation for the purpose of controlling a compact motor, for the detection of rotation for the purpose of position detection in a business machine or equipment or for the detection of a joint angle of an articulated robot.

2. Description of the Prior Art

For detecting a rotation or an angle of, for example, a joint of an articulated robot, a bearing assembly with a rotation detection device of a kind having a rotation detecting device integrated in a bearing assembly for supporting a shaft at an articulation is employed. Such a bearing assembly with a rotation detection device is desired to be compact in size, and this is particularly true where the bearing assembly is intended for use in a knuckle joint of a robot. In order to meet with this desire, the applicant of the present invention has suggested such a bearing assembly with a rotation detection device as shown in FIG. 22, which is disclosed in the Japanese Laid-open Patent Publication No. 2004-37133 published Feb. 5, 2004.

The bearing assembly with a rotation detection device shown in FIG. 22 is of a structure including a magnetic generating element 32 arranged on an inner race 51 side, which is a rotating ring, and having a directionality about a rotation axis of such inner race 51 (magnetic variation in a circumferential direction), and a magnetic line sensor 33 arranged on an outer race 52 side, which is a stationary ring, in opposition to the magnetic generating element 32. The magnetic line sensor 33 is operable to detect a magnetism emanating from the magnetic generating element 32, which is made up of a permanent magnet 32A and magnetic yokes 32B and is fitted to the inner race 51 through a magnetic generating element fitting member 45 that is press-fitted onto an outer diametric surface of the inner race 51. Since the inner race 51 rotates together with a rotary shaft 40, the magnetic generating element 32 also rotates together with the rotary shaft 40 through the magnetic generating element fitting member 45. The magnetic line sensor 33 referred to above is fitted to the outer race 52 through a sensor fitting member 57 that is press-fitted inside an inner diametric surface of the outer race 52.

It has, however, been found that in the bearing assembly with a rotation detection device of the structure discussed above, the manner of incorporating the rotation detecting device into the bearing assembly is not optimized and has a substantial length in a direction axially thereof. In other words, since the magnetic generating element 32 is fitted to the inner race 51 through the intervention of the magnetic generating element fitting member 45 that is press-fitted onto the outer diametric surface of the inner race 51, the axial dimension of the entire assembly tends to be substantial and downsizing thereof is not sufficient.

SUMMARY OF THE INVENTION

An object of the present invention is to provide a bearing assembly with a rotation detection device which is downsized and particularly has the axial dimension reduced.

The bearing assembly with a rotation detection device of the present invention includes a magnetic generating element arranged on an inner race side of the bearing assembly and having a directionality about a rotation axis, and a rotation sensor fitted to an outer race side in alignment with a bearing axis for detecting a magnetism, generated from the magnetic generating element, and for outputting information descriptive of rotation or angle. The magnetic generating element referred to above is fixed to a fixing member secured to an inner diametric side of the inner race of the bearing assembly. It is to be noted that the term "inner race side" referred to above is intended to mean an inner race or a member rotatable together with the inner race and the term "outer race side" is intended to mean an outer race or a member fixed to the outer race. The directionality of the magnetic generating element about the rotation axis denotes a state in which magnetic fields generated are changing in a circumferential direction. In this way, the rotation sensor can detect a relative rotation of inner and outer races.

According to this construction, since the magnetic generating element is fixed to the fixing member secured to the inner diametric side of the inner race of the bearing assembly, unlike the case in which the use is made of a fixing member mounted on an outer diametric side, there is no need to allow the fixing member to protrude a substantial distance from a plane of an end face of the inner race. Accordingly, downsizing is possible and, particularly, the length in an axial direction can be reduced.

The fixing member referred to above may be a shaft. In the case of the use of the shaft for the fixing member, since the shaft concurrently serves as a fixing member to which the magnetic generating element is fixed, there is no need to use an extra fixing member hitherto required and the number of component parts can be reduced, allowing an effect of reducing the axial length to be further increased.

The fixing member referred to above may be a member separate from a shaft and may be press-fitted into or bonded to an inner diametric surface of the inner race. Since the magnetic generating element is fixed to the fixing member that is separate from the shaft, the axial length can be reduced as compared with that of the conventional example, while preserving the feature of the conventional example, in which the shaft can be separated from the bearing assembly.

In the present invention, the fixing member may be positioned in abutment against an end face of the inner race or a stepped face defined in the inner race so as to be oriented axially. Where held in abutment against the end face of the inner race, the fixing member may have a flange defined in an outer periphery of an inner race engagement portion so that the flange can be engaged with the end face of the inner race.

In the case of this construction, the fixing member can be easily positioned on an inner diametric side of the inner race with the end face of the inner race or the stepped face taken as a reference plane. Accordingly, the fixing member can be fitted to the inner race so that a fixing surface of the magnetic generating element in the fixing member may lie perpendicular to the axis of the bearing assembly, that is, the magnetic generating element can be held parallel to the rotation sensor. Therefore, the parallelism and the clearance between the magnetic generating element and the rotation sensor can be maintained to a predetermined precision. As a result thereof, it is possible to suppress any undesirable variation of the strength of a magnetic field pattern on the surface of the rotation sensor, which would otherwise result from rotation of the magnetic generating element. Also, since the clearance referred to above can be made smaller than that in the conventional example, the magnetic field strength to be detected by the rotation sensor increases, accompanied by increase of the S/N ratio. Owing to those two effects, the rotation detecting precision of the rotation detecting device can be increased.

In the present invention, the magnetic generating element may include two permanent magnets each magnetized axially.

In the case of this construction, since the magnetic generating element is not constructed of a combination of a permanent magnet and magnetic yokes made of a magnetic material as is the case with that in the conventional example, but is constructed solely of the permanent magnets, the magnetic generating element can have a thickness smaller than that in the conventional example and, accordingly, the axial length thereof can also be reduced. Also, if the fixing member is made of a magnetic material, the fixing member forms a magnetic circuit of the magnetic generating element and, therefore, the magnetic flux generated from the magnetic generating element so as to pass across a surface of the rotation sensor that is oriented, resulting in increase of the rotation detecting sensitivity.

In the present invention, the magnetic generating element referred to above may include a single permanent magnet having N- and S-poles defined on one surface thereof. In the case of this construction, the magnetic generating element can easily be constructed solely with the single permanent magnet. Also, since no magnetic flux emanating from the permanent magnet pass to the fixing member side, the magnetic characteristic of the fixing member will not virtually affect the magnetic flux passing across the rotation sensor. Accordingly, without the rotation detecting precision affected, the fixing member may be made of either one of the magnetic and non-magnetic material.

In the present invention, the fixing member may be formed with a recessed pocket defined therein and the permanent magnet or permanent magnets may then be fixed in the recessed pocket. It has been experienced that since a magnetic force of attraction or repulsion acts between the permanent magnets or between the permanent magnet or magnets and any other magnetic element, incorporation of the permanent magnet or magnets in the fixing member is difficult to achieve. However, when the permanent magnet or magnets are inserted in the recessed pocket defined in the fixing member, the fixing of the permanent magnet or magnets to the fixing member can easily be achieved with high precision and with a minimized axial displacement.

In the present invention, the permanent magnet or permanent magnets may be encompassed with a flexible material such as a resinous material, which is more flexible than the permanent magnet and the fixing member, which flexible material may be fixed in the recessed pocket together with the permanent magnet or permanent magnets. Where each of the permanent magnets is made of a sintered magnetic material, those permanent magnets may have a relatively low mechanical strength and may be so fragile as to be unsuitable to be press-fitted. However, the above described manner of securing the permanent magnets is particularly effective to allow the permanent magnet or magnets to be press-fitted into the recessed pocket.

In the present invention, the fixing member may be made of a non-magnetic material and a magnetic yoke may be interposed between the magnetic generating element and the fixing member. Where the magnetic generating element includes the permanent magnet that is axially magnetized, the efficiency of magnetism of the magnetic generating element, when the permanent magnets are directly fixed to the fixing member made of a non-magnetic material, will be lowered. However, the intervention of the magnetic yoke as described above is effective to increase the magnetic flux, which may pass across the surface of the rotation sensor, by tens of percent as compared with the case where no magnetic yoke is interposed. As a result thereof, the S/N ratio of a magnetic signal detected by the rotation sensor can increase, enabling the detection of rotations with increased precision.

The fixing member referred to above may be a shaft made up of a shaft main body and a shaft end body coupled with one end of the shaft main body, in which case the magnetic generating element is fixed to the shaft end body. According to this construction, since the rotary shaft main body and the rotary shaft end body are separable from each other, the bearing assembly with a rotation detection device can be separated from the rotary shaft main body, allowing the maintenance of the bearing assembly to be facilitated.

In the present invention, the rotation sensor may include a plurality of magnetic sensor elements and a circuit for converting respective outputs of the magnetic sensor elements into a rotation signal or an angle signal, in which the magnetic sensor elements and the converting circuit may be integrated together on, for example, a semiconductor chip. By integrating the magnetic sensor elements and the angle signal converting circuit together on the semiconductor chip in this way, no electric wiring between the magnetic sensor elements and the angle signal converting circuit is required, allowing the rotation sensor to be manufactured compact in side with an increased reliability against wiring breakage or the like and, at the same time, the rotation detecting device can easily be assembled.

In the present invention, the rotation sensor may include four magnetic line sensors including the magnetic sensor elements arranged along four sides of an imaginary rectangular shape, and a calculating unit may be positioned inside the rectangular arrangement of the magnetic line sensors for converting respective sensor outputs of the magnetic line sensors into a rotation information or an angle information.

In the case of this construction, a plurality of the magnetic sensors positioned inside the rotation sensor may be of a type operable to detect a sinusoidal signal and a cosine signal of magnetic fields that rotate with rotation of the magnetic generating element, and a converting circuit may include a calculating unit for converting signals, detected by the magnetic sensors, into a rotation signal or an angle signal.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE PREFERRED EMBODIMENTS

Figure 1:
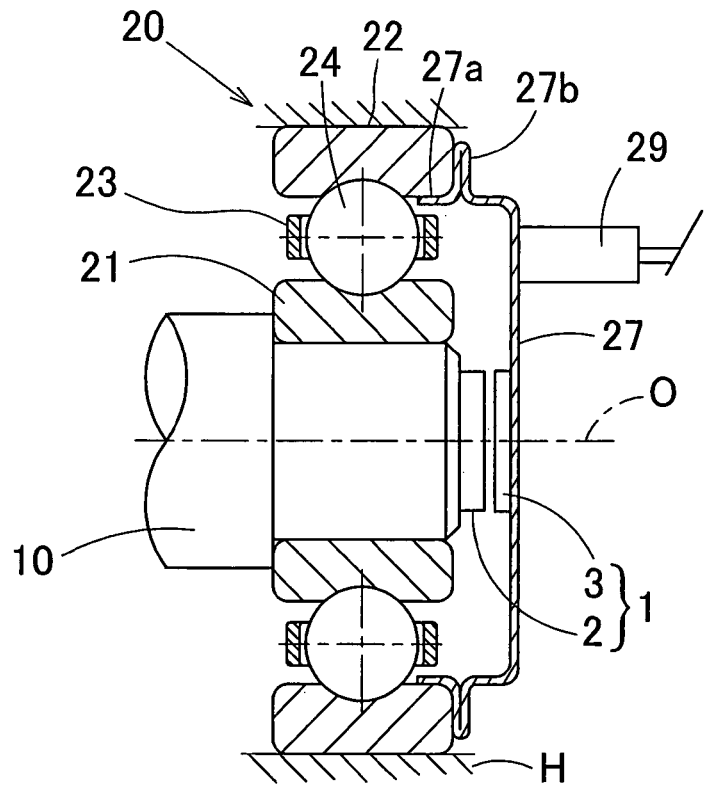
FIG. 1 is a longitudinal sectional view of a bearing assembly with a rotation detection device according to a first preferred embodiment of the present invention.

Hereinafter, preferred embodiments of the present invention will be described in detail with reference to the accompanying drawings. In particular, FIG. 1 illustrates a longitudinal sectional view of a bearing assembly with a rotation detection device according to a first preferred embodiment of the present invention. The bearing assembly with a rotation detection device shown therein is of a type in which a rotation detecting device 1 is incorporated in a rolling bearing assembly 20. The rolling bearing assembly 20 is of a structure, in which a plurality of rolling elements 24 retained by a retainer 23 is interposed between respective raceways of inner and outer races 21 and 22. The rolling element 24 is in the form of a ball and this rolling bearing assembly 20 represents a single row deep groove ball bearing. The inner race 21 is press-fitted with a rotary shaft 10 for rotation together therewith. The outer race 22 is held stationary having been disposed inside a housing H of a machine utilizing the bearing assembly.

The rotation detecting device 1 is made up of a magnetic generating element 2, disposed on an inner race 21 side of the rolling bearing assembly 20, and a rotation sensor 3 disposed on an outer race 22 side.

Figure 2:
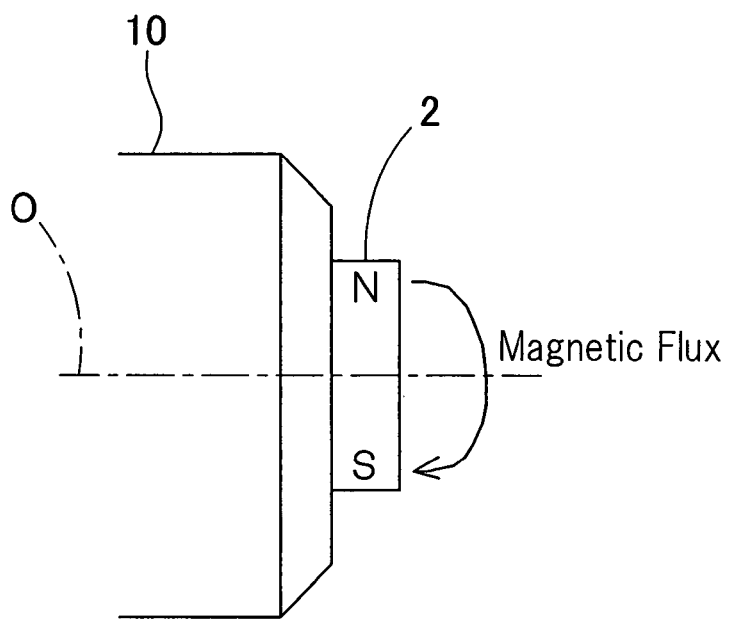
FIG. 2 is an enlarged side view showing a fixing portion in the bearing assembly shown in FIG. 1, where a magnetic generating element is fitted.

The magnetic generating element 2 is employed in the form of a permanent magnet and, as shown in FIG. 2, is capable of generating a magnetism having a directionality deployed about a rotation axis O of the rolling bearing assembly 20. The magnetic generating element 2 in the form of the permanent magnet makes use of the rotary shaft 10 as a fixing member and is fixed to a center portion of one end face of the rotary shaft 10 so that the rotation axis O of the rolling bearing assembly 20 is held in alignment with a center axis of the permanent magnet 2. This magnetic generating element 2 rotates together with the rotary shaft 10, accompanied by gyration of N- and S-poles of the permanent magnet about the rotation axis O.

The rotation sensor 3 shown in FIG. 1 is operable to detect the magnetism emanating from the magnetic generating element 2 and then to output information descriptive of the rotation or angle. This rotation sensor 3 is fitted to the outer race 22 through a sensor fitting member 27 so as to confront the magnetic generating element 2 in a direction axially in alignment with the rotation axis O of the rolling bearing assembly 20. More specifically, the outer race 22 has the sensor fitting member 27 fitted thereto and the rotation sensor 3 is then secured to the sensor fitting member 27. The sensor fitting member 27 is prepared from a metallic plate by the use of any known bending technique so as to have an axially protruding cylindrical wall 27a at an outer peripheral portion thereof with a collar 27b formed in the vicinity of the cylindrical wall 27a. This sensor fitting member 27 is fitted to the outer race 22 with the cylindrical wall 27a thereof engaged with an inner diametric surface or an inner periphery of the outer race 22 and is axially positioned with the collar 27b abutted against an end face of the outer race 22. Also, the sensor fitting member 27 has an output cable 29 connected thereto so that an output from the rotation sensor can be drawn outwardly to an external circuit.

Figure 3:
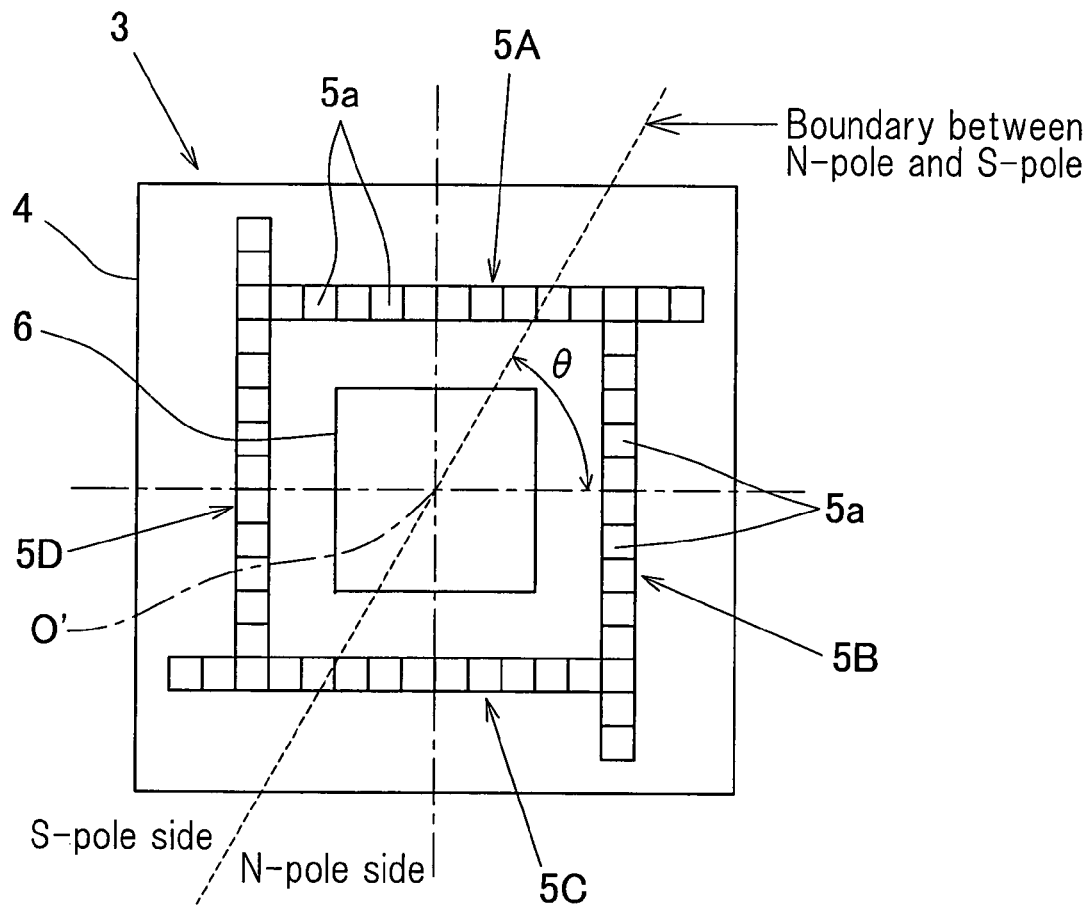
FIG. 3 is a front elevational view of a semiconductor chip forming an example of a rotation sensor used in the bearing assembly shown in FIG. 1.

As best shown in FIG. 3 in a front elevational representation, the rotation sensor 3 includes a plurality of magnetic sensor elements 5a and a converting circuit 6 forming a calculating unit for converting outputs from the magnetic sensor elements 5a into a signal descriptive of the rotation or angle, all of those circuit elements 5a and 6 being integrated on a single semiconductor chip 4. In this semiconductor chip 4, the magnetic sensor elements 5a are arranged in a substantially rectangular pattern so as to form four magnetic sensor trains 5A, 5B, 5C and 5D. In this case, the substantially rectangular pattern, in which the magnetic sensor elements 5a are arranged, has a center O' coaxial with the rotation axis O of the rolling bearing assembly 20. It is to be noted that although each of the four magnetic sensor trains 5A to 5D is shown as in the form of a single linear array of the sensor elements 5a, each magnetic line sensor 5A to 5D may have a plurality of parallel extending linear arrays of the magnetic sensor elements 5a.

The converting circuit 6 referred to above is positioned inside the substantially rectangular pattern represented by the magnetic sensor trains 5A to 5D. The semiconductor chip 4 has a element carrier surface, on which the magnetic sensor elements 5a are arranged, and is fixed to the sensor fitting member 27 with the element carrier surface thereof held in face-to-face relation with the magnetic generating element (permanent magnet) 2 shown in FIG. 1.

By integrating as described above, the magnetic sensor elements 5a and the converting circuit 6 on the semiconductor chip 4 as shown in FIG. 3, electric wirings, which is required where the both are separate from each other, can be advantageously dispensed with and, hence, the rotation sensor 3 can be assembled compact in size and the rotation detecting device 1 can also be assembled easily, with an increased reliability against wiring disconnection. In particular, by arranging the converting circuit 6 inside the magnetic sensor trains 5A to 5D that are arranged in the substantially rectangular pattern as hereinbefore described, the semiconductor chip 4 can have a reduced size.

Figure 4:
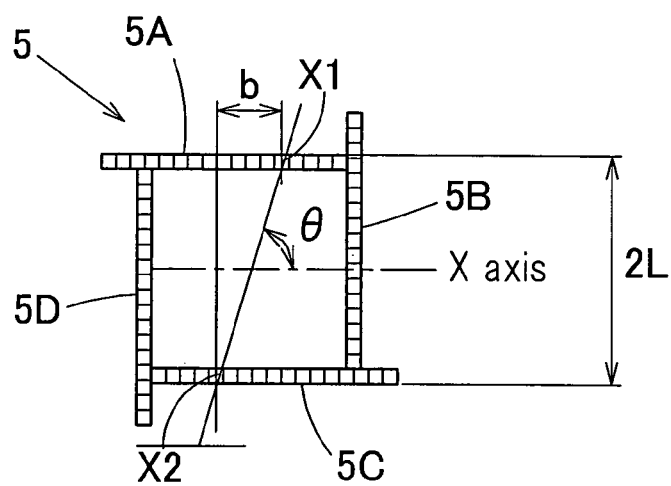
FIG. 4 is a schematic diagram showing an angle calculating process performed in a converting circuit of the rotation sensor shown in FIG. 3.
Figure 5:
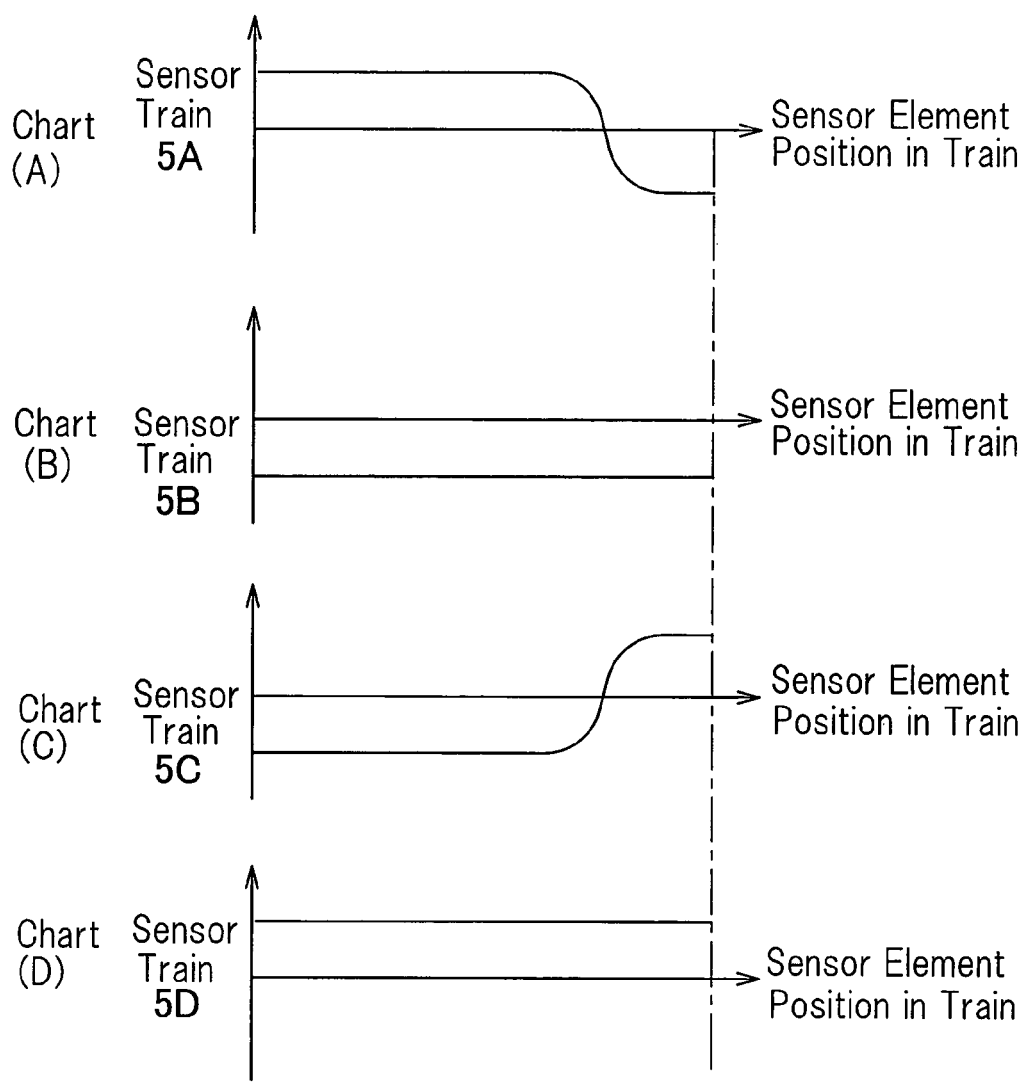
FIG. 5 shows charts illustrating various waveforms of magnetic sensor array outputs in the rotation sensor shown in FIG. 4.

FIG. 4 is a schematic diagram used to explain the angle calculating process performed by the converting circuit 6. FIG. 5 shows Charts (A) to (D) representing respective waveforms of outputs that are generated from the corresponding sensor trains 5A to 5D at a certain moment during rotation of the rotary shaft 10. In each of Charts (A) to (D), the axis of abscissas represents respective positions of the magnetic sensor elements 5a in the associated magnetic line sensor 5A to 5D and the axis of ordinates represents the intensity of detected magnetic field.

Let it be assumed that a zero crossing position, which is a boundary between the magnetic N-pole and the magnetic S-pole of the magnetic fields detected by the magnetic sensor trains 5A to 5D, contains at a position X1 and a position X2 shown in FIG. 4. In this condition, respective outputs from the magnetic sensor trains 5A to 5D represent such waveforms as shown in Charts (A) to (D). Accordingly, the zero crossing positions X1 and X2 can be calculated by extracting signals in the vicinity of those zero crossing from the respective outputs of the magnetic sensor trains 5A and 5C and then linearly approximating them to each other.

Calculation of the angle can be accomplished with the use of the following formula (I):

$$\theta = \tan^{-1}(2L/b) \tag{1}$$

wherein θ represents the rotation angle θ of the permanent magnet 2 expressed in terms of the absolute angle (absolute value), 2 L represents the length of one of four sides of the rectangular shape depicted by the magnetic sensor trains 5A to 5D, and b represents the transverse length between the zero crossing positions X1 and X2.

When the zero crossing positions X1 and X2 lie on the magnetic line sensors 5B and 5D, respectively, the rotation angle θ can be calculated in a manner similar to that described above, using zero crossing position data obtained from the respective outputs of those magnetic line sensors 5B and 5D. The rotation angle θ calculated by the converting circuit 6 can be outputted through the output cable 29.

Figure 22:
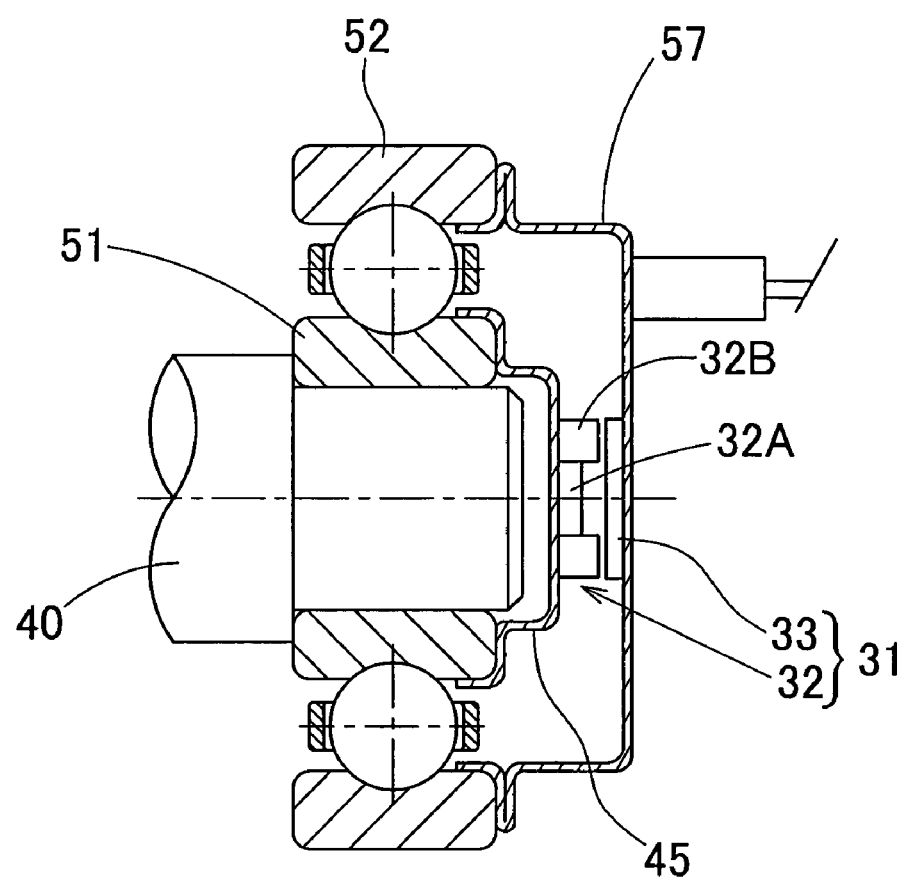
FIG. 22 is a longitudinal sectional view showing the conventional example.

According to the bearing assembly with a rotation detection device of the structure described hereinabove, the magnetic generating element (permanent magnet) 2 of the rotation detecting device 1 shown in FIG. 1 is fixed to a fixing member (the rotary shaft 10 in the illustrated embodiment) fitted to an inner diametric side of the inner race 21 of the rolling bearing assembly 20 and, therefore, unlike the conventional example shown in FIG. 22, no fixing member protruding axially from an end face of the inner race is necessary, resulting in reduction of the length as measured axially. Also, the magnetic generating element employed in the present invention is not formed by a combination of the permanent magnet and the magnetic yoke such as in the conventional example, but is formed solely by the permanent magnet, and, therefore, the magnetic generating element 2 can be formed to have a thickness smaller than that in the conventional example and, accordingly, the axial length thereof can further be reduced. In particular, since in the illustrated embodiment described above, the rotary shaft 10 concurrently serves as the fixing member to which the magnetic generating element 2 is fixed and, accordingly, no separate fixing member is needed, resulting in reduction of the number of component parts used along with a further reduction of the axial length.

It is to be noted that in describing the first embodiment of the present invention, as the rotation sensor 3, the magnetic sensor trains 5A to 5D including the plurality of magnetic sensors 5a arranged on the semiconductor chip 4, shown in FIG. 3, in the substantially rectangular pattern has been utilized to detect the magnetism emanating from the magnetic generating element 2. However, the rotation sensor 3A may be constituted by at least two magnetic sensor elements 5a and 5b that are spaced 90° from each other angularly about the center O' of the semiconductor chip 4 (which is coaxial with the rotation axis O of the rolling bearing assembly 20) as shown in FIG. 6.

Figure 6:
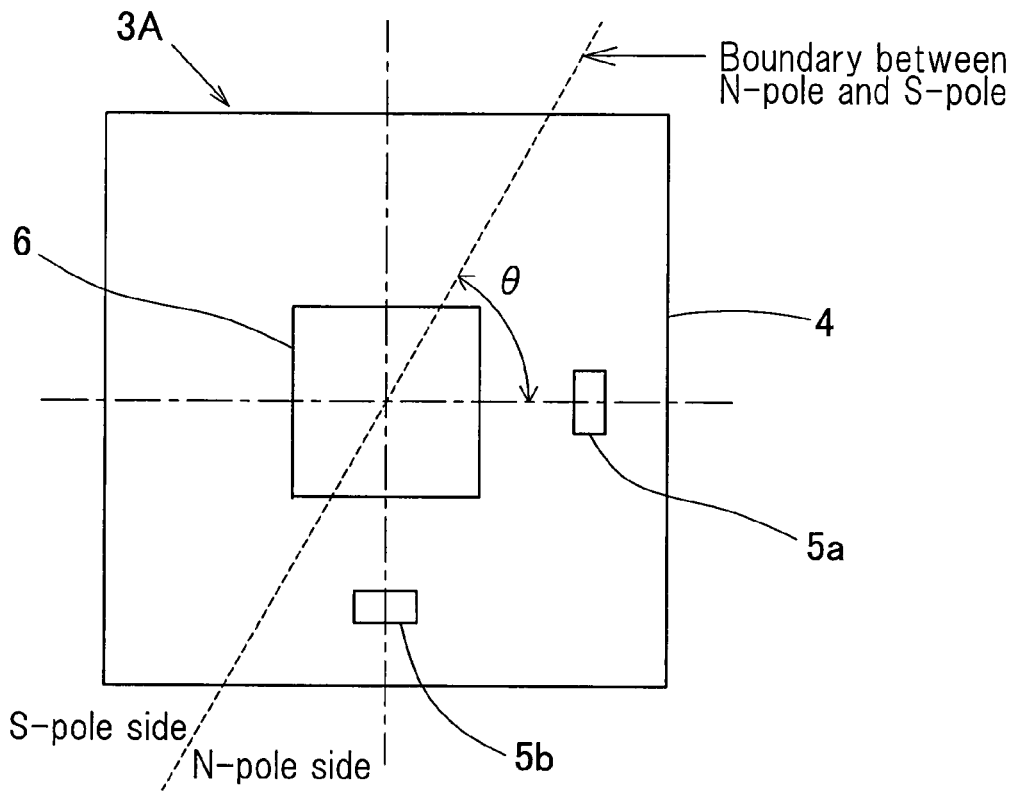
FIG. 6 is a plan view of a semiconductor chip forming another example of the rotation sensor used in the bearing assembly with a rotation detection device.
Figure 7:
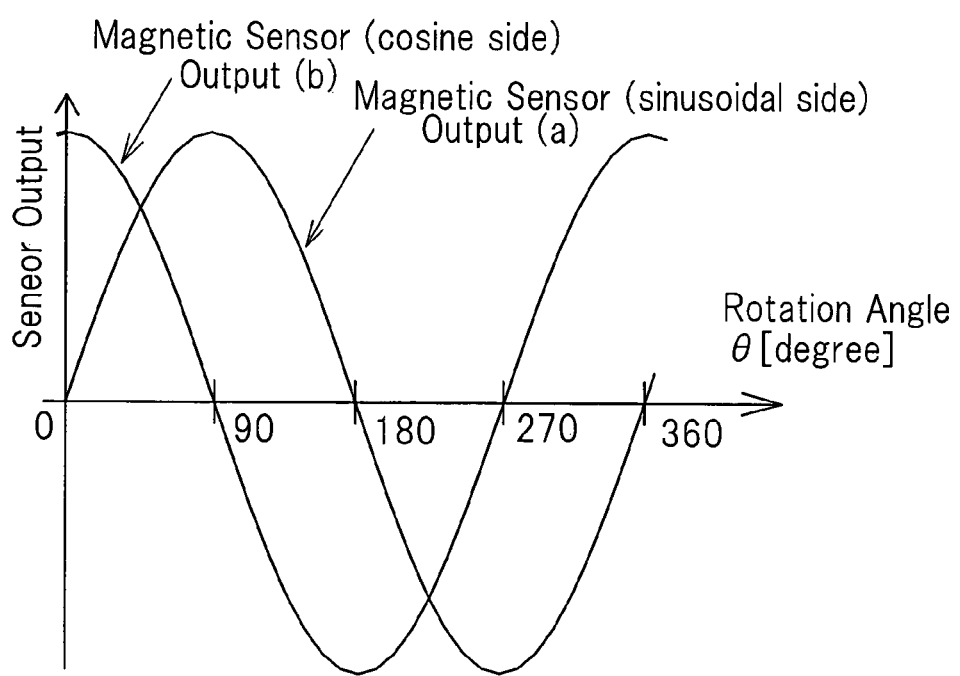
FIG. 7 is a diagram showing an output waveform generated from a magnetic sensor element of the rotation sensor shown in FIG. 6.

It is also to be noted that even in the example shown in FIG. 6, the converting circuit 6, which serves as the calculating unit for converting the respective outputs of the magnetic sensor elements 5a and 5b into rotation or angle signals is integrated on the semiconductor chip 4 together with the magnetic sensor elements 5a and 5b in a manner similar to that shown in and described with reference to FIG. 3.

Where the rotation sensor 3A is so constructed as shown in FIG. 6, the respective outputs of the magnetic sensor elements 5a and 5b vary with change of the rotation angle θ of the magnetic generating element 2 and, as shown in FIG. 7, the output a of one of the magnetic sensor elements, for example, the magnetic sensor element 5a represents a sinusoidal signal whereas the output b of the other magnetic sensor element 5b represents a cosine signal. Accordingly, the rotation angle θ can be calculated with the arctangent of a/b and positive and negative of a and b. This calculation is performed by the converting circuit 6. Where the output waveforms shown in FIG. 7 contain strains relative to the ideal sinusoidal wave and the ideal cosine wave, respectively, a correction table may be employed in the converting circuit 6 to rectify the strains so that deterioration of detection accuracy of the rotation angle θ can be prevented.

Figure 8A:
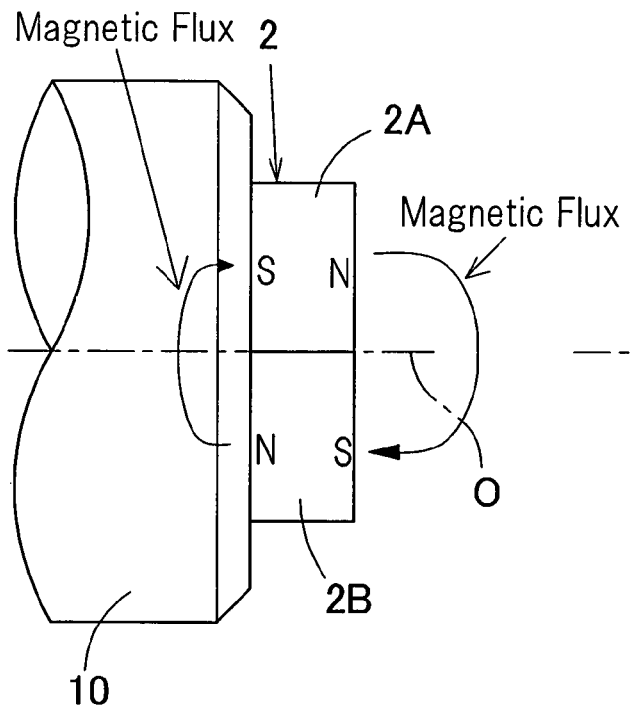
FIG. 8A is an enlarged diagram showing one example of the fixing portion in the bearing assembly, where the magnetic generating element is fitted.
Figure 8B:
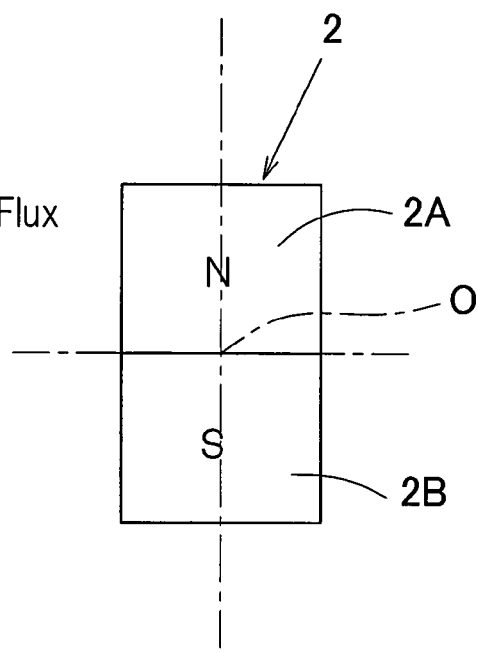
FIG. 8B is a front elevational view of the magnetic generating element.

Also, although in describing the foregoing embodiment, the details of the magnetic generating element 2 have not been described, the magnetic generating element 2 may have such a specific structure as shown in FIGS. 8A and 8B in side and front elevational views, respectively. Specifically, the magnetic generating element 2 may include two permanent magnets 2A and 2B of a quadrilateral configuration that are magnetized axially and are arranged in a direction radially with respect to the rotation axis O of the rotary shaft 10. It is, however, to be noted that each of the permanent magnets 2A and 2B may have any other suitable shape such as, for example, a semicircular shape.

In the case of the above described construction shown in and described with reference to FIGS. 8A and 8B, where the rotary shaft 10 is made of a magnetic material, a portion of the rotary shaft 10 will form a part of a magnetic circuit of the magnetic generating element 2, the magnetic flux generated from the magnetic generating element 2 and passing through a surface of the semiconductor chip 4 (rotation sensor 3) opposed to the magnetic generating element 2 will increase, resulting in increase of the rotation detecting sensitivity.

Figure 9A:
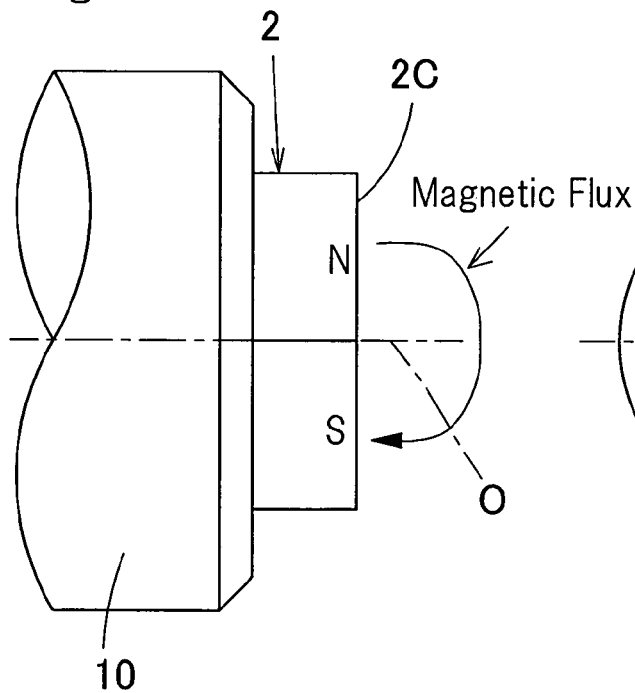
FIG. 9A is an enlarged diagram showing another example of the fixing portion in the bearing assembly shown in FIG. 1, where the magnetic generating element is fitted.
Figure 9B:
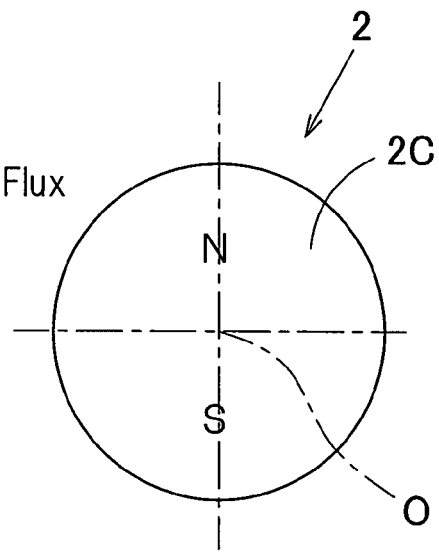
FIG. 9B is a front elevational view of the magnetic generating element.

As another specific structure of the magnetic generating element 2, the magnetic generating element 2 may include, as shown in FIGS. 9A and 9B in side and front elevations representations, a single permanent magnet 2C of a round configuration having one surface magnetized to N- and S-poles and secured to the end face of the rotary shaft 10 with a symmetry center aligned coaxially with the rotation axis O of the rotary shaft 10. The permanent magnet 2C may have any other suitable shape other than the round configuration, such as, for example, a square configuration.

In the case of the above described construction shown in and described with reference to FIGS. 9A and 9B, the magnetic generating element 2 can be easily assembled with the only permanent magnet 2C. Also, since no magnetic flux of the permanent magnet 2C passes towards a side of the rotary shaft 10, the magnetic characteristic of the rotary shaft 10 will not be virtually affected by the magnetic flux passing across the semiconductor chip 4 (rotation sensor 3). Accordingly, the rotary shaft 10 can be made of any of the magnetic and non-magnetic materials without the rotation detecting precision being affected.

Figure 10A:
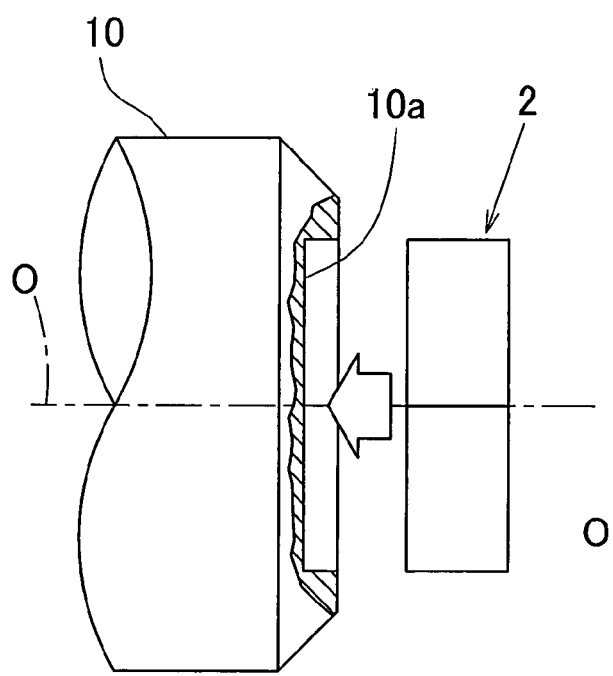
FIG. 10A is an exploded side view showing a further example of the fixing portion in the bearing assembly shown in FIG. 1, where the magnetic generating element is to be fitted.
Figure 10B:
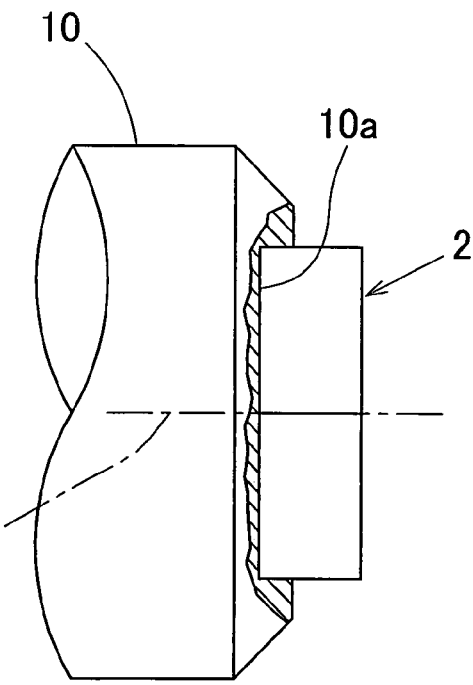
FIG. 10B is an exploded side view showing a further example of the fixing portion in the bearing assembly shown in FIG. 1, where the magnetic generating element is fitted.

In the foregoing embodiment, the permanent magnet 2 forming the magnetic generating element has been shown and described as secured directly to the end face of the rotary shaft 10. However, the permanent magnet 2 alternatively may be secured thereto in a manner which will now be described with reference to FIGS. 10A and 10B. Specifically, in an example shown in FIGS. 10A and 10B, the end face of the rotary shaft 10 has an axially inwardly recessed pocket 10a defined therein so as to extend axially inwardly of the rotary shaft 10 as best shown in FIG. 10A and the permanent magnet 2 is inserted into and is then fixedly bonded to the axially inwardly recessed pocket 10a as best shown in FIG. 10B.

Considering that the magnetic force of attraction or the magnetic force of repulsion acts between the permanent magnet 2 and a different permanent magnet or magnetic material, incorporation of the permanent magnet 2 to the rotary shaft 10 is not easy where the rotary shaft 10 is made of a magnetic material. However, when the permanent magnet 2 is inserted into and fixed in position within the recessed pocket 10a defined in the rotary shaft 10 in the manner described above, the permanent magnet 2 can be secured to the rotary shaft 10 easily and highly precisely with reduced misalignment occurring therebetween. The manner of securing the permanent magnet 2 to the rotary shaft 10 shown in and described with reference to FIGS. 10A and 10B can be equally utilized to the case where the magnetic generating element 2 is made up of the two permanent magnets 2A and 2B such as shown in and described with reference to FIG. 8. In this case, even though the magnetic force of attraction or the magnetic force of repulsion acts between the permanent magnets 2A and 2B and/or between the permanent magnets and the rotary shaft 10 made of the magnetic material, the permanent magnets 2A and 2B can be secured to the rotary shaft 10 easily and highly precisely with reduced misalignment occurring therebetween.

Figure 11A:
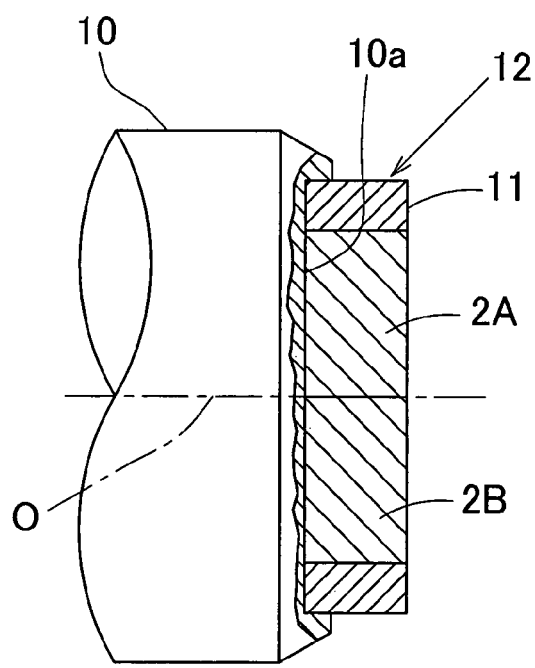
FIG. 11A is an enlarged side view showing a still further example of the fixing portion in the bearing assembly shown in FIG. 1, where the magnetic generating element is fitted.
Figure 11B:
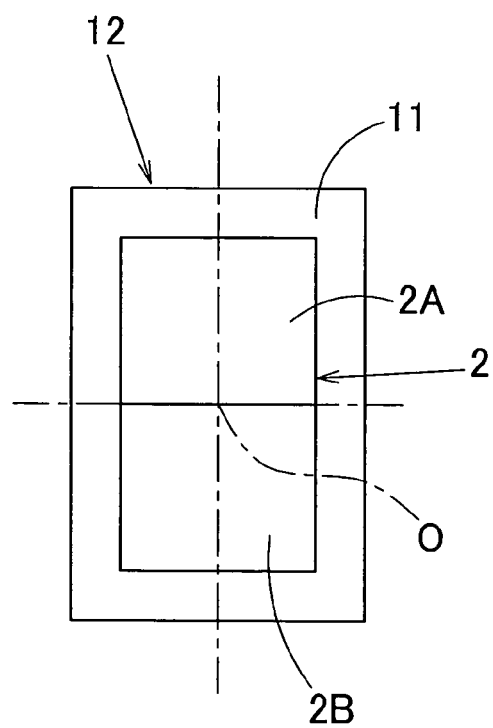
FIG. 11B is a front elevational view of the magnetic generating element.

In the example shown in FIGS. 11A and 11B, the two permanent magnets 2A and 2B are encompassed together with, for example, a resinous member 11 having a relatively high flexibility than that of any one of the permanent magnets 2A and 2B and the rotary shaft 10 so that the two permanent magnets 2A and 2B can be integrated together with the resinous member 11 to form a unitary structure 12 as best shown in FIG. 1B. The unitary structure 12 is then press-fitted into and fixed in position inside the axially inwardly recessed pocket 10a defined in the end face of the rotary shaft 10.

Where each of the permanent magnets 2A and 2B is made of, for example, a sintered magnetic material, those permanent magnets 2A and 2B tend to have a relatively low mechanical strength and may be so fragile as to be unsuitable for press-fitting. However, the manner of securing the permanent magnets 2A and 2B to the rotary shaft 10 shown in and described with reference to FIGS. 11A and 11B is particularly advantageous in that even the permanent magnets 2A and 2B made of the sintered magnetic material can be press-fitted into the recessed pocket 10a in the rotary shaft 10. It is to be noted that this manner of securing may be equally utilized to the case where the magnetic generating element 2 is made up of the sole permanent magnet 2 such as shown in and described with reference to FIG. 9, so that the permanent magnet 2 can easily be press-fitted into the recessed pocket 10a.

Figure 12:
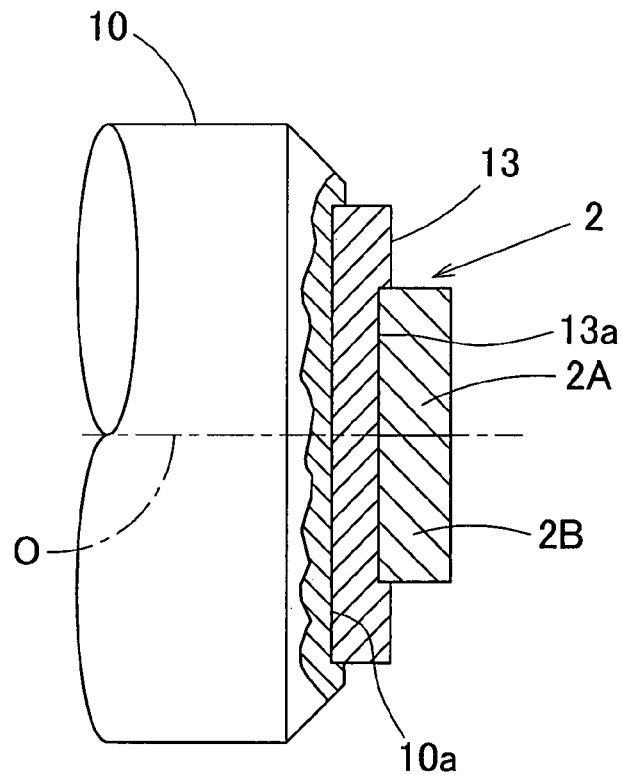
FIG. 12 is an enlarged side view showing a still yet further example of the fixing portion in the bearing assembly shown in FIG. 1, where the magnetic generating element is fitted.

In the example shown in FIG. 12, the two permanent magnets 2A and 2B shown in FIG. 8 are secured to the end face of the rotary shaft 10 through a magnetic yoke 13 made of a magnetic material. More specifically, a recess 13a is defined in one of opposite surfaces of the magnetic yoke 13 remote from the rotary shaft 10 and the two permanent magnets 2A and 2B are fixedly inserted in the recess 13a while the magnetic yoke 13 is fixedly inserted in the recessed pocket 10a defined in that end face of the rotary shaft 10. It is to be noted that the sequence of fitting the permanent magnets 2A and 2B to the end face of the rotary shaft 10 may be such that after the magnetic yoke 13 has been fixedly inserted in the recessed pocket 10a of the rotary shaft 10, the permanent magnets 2A and 2B are then fixedly inserted in the recess 13a of the magnetic yoke 13.

Considering that each of the two permanent magnets 2A and 2B forming the magnetic generating element 2 is magnetized in an axial direction, the efficiency of magnetism of the magnetic generating element 2, when the two permanent magnets 2A and 2B are directly fixed to the rotary shaft 10 made up of a non-magnetic material will be lowered. However, the intervention of the magnetic yoke 13 therebetween such as shown in FIG. 12 is effective to increase the magnetic flux, which may pass across the surface of the semiconductor chip 4 (rotation sensor 3), by tens of percent as compared with the case where no magnetic yoke is interposed. As a result thereof, the S/N ratio of a magnetic signal detected by the rotation sensor 3 can increase, enabling the detection of rotations with increased precision.

Figure 13:
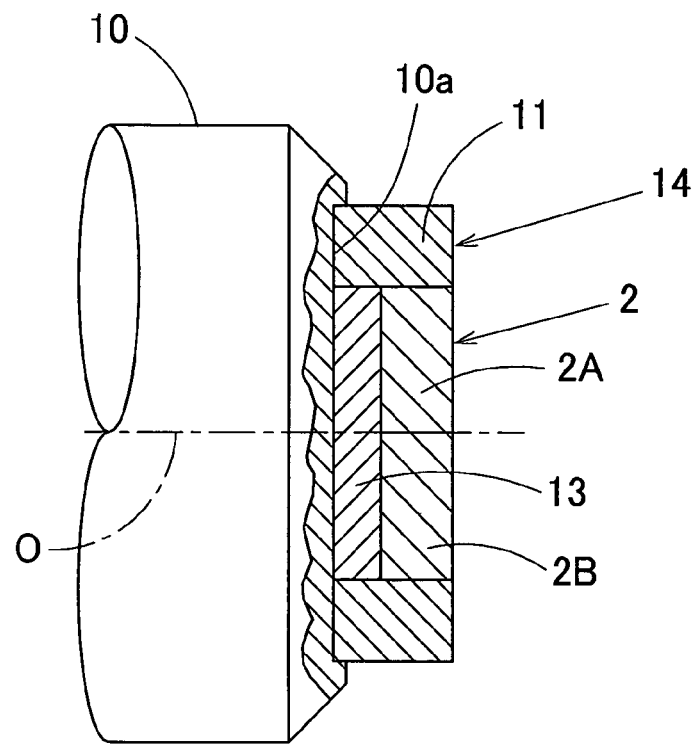
FIG. 13 is an enlarged side view showing a different example of the fixing portion in the bearing assembly shown in FIG. 1, where the magnetic generating element is fitted.

FIG. 13 shows another example for the structure in which the magnetic generating element 2 including the two permanent magnets 2A and 2B shown in FIG. 8 is fixed to the end face of the rotary shaft 10. The assembly of the permanent magnets 2A and 2B and the magnetic yoke 13 overlapped with the permanent magnets 2A and 2B is in turn encompassed with a resinous member 11 to provide a unitary structure 14, which is then fixedly inserted in the recessed pocket 10a defined in the end face of the rotary shaft 10. Even in this case, the magnetic yoke 13 is structurally sandwiched between the rotary shaft 10, made of the non-magnetic material, and the permanent magnets 2A and 2B and, therefore, the efficiency of magnetism of the magnetic generating element 2 can be advantageously increased.

Figure 14:
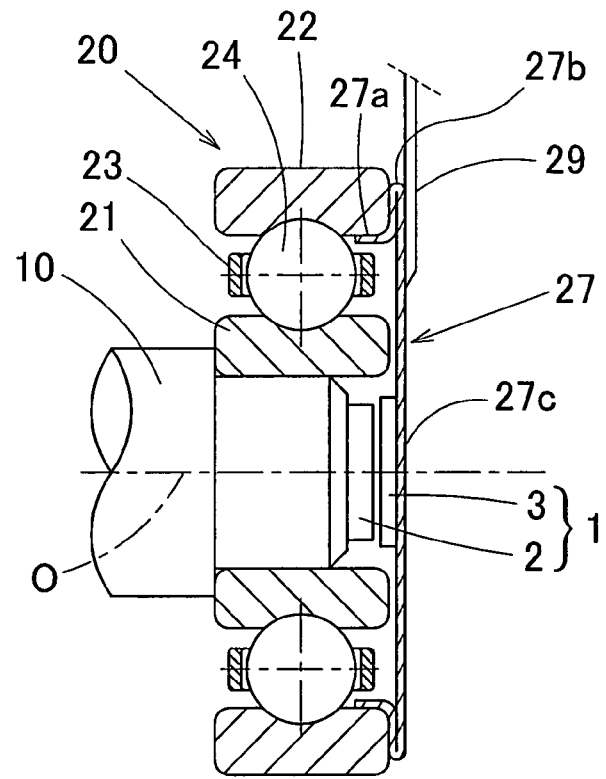
FIG. 14 is a longitudinal sectional view of the bearing assembly with a rotation detection device according to a second preferred embodiment of the present invention.

Referring now to FIG. 14, there is shown a second preferred embodiment of the present invention. The bearing assembly with a rotation detection device according to this second embodiment is substantially similar to that shown and described in connection with the first embodiment shown in FIG. 1, except for the following differences. Specifically, in the embodiment shown in FIG. 14, the rotary shaft 10, which has the end face fixed with the magnetic generating element 2, has a portion, inserted into the bearing inner race 21, of a length reduced as compared with that in the first embodiment, such that the position of the magnetic generating element 2 in an axial direction can be set backwards from a plane of the end face of the rotary shaft 10 in a direction inwardly of the bearing inner race 21 and, also, the axial position of an end face portion 27 of the sensor fitting member 27, which defines the position at which the sensor is fitted, is aligned with the collar 27b integral with the sensor fitting member 27. In addition, the output cable 29 drawn outwardly from the sensor fitting member 27 is employed in the form of, for example, a flexible flat cable. Other structural features of the bearing assembly with a rotation detection device according to the second embodiment are substantially similar to those of the bearing assembly according to the first embodiment.

According to the second embodiment described above, since the axial position of the rotation detecting device 1 is brought closer to the rolling bearing assembly 20 than that according to the embodiment shown in and described with reference to FIG. 1 and since the output cable 29 can be drawn a reduced distance outwardly in the axial direction from the sensor fitting member 27 as compared with that in the first embodiment, the bearing assembly with a rotation detection device as a whole can have a reduced axial dimension.

Figure 15:
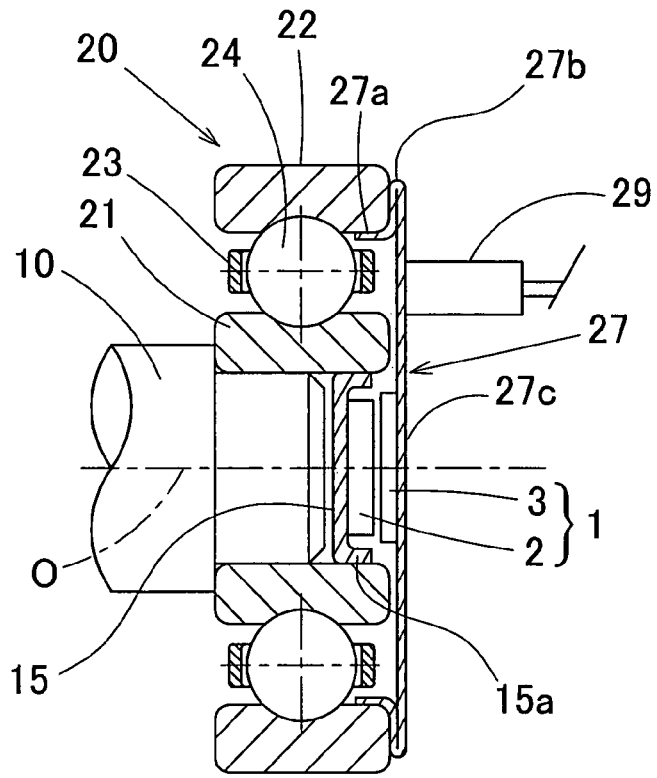
FIG. 15 is a longitudinal sectional view of the bearing assembly with a rotation detection device according to a third preferred embodiment of the present invention.

Referring to FIG. 15, there is shown a third preferred embodiment of the present invention. The bearing assembly with a rotation detection device according to this third embodiment is substantially similar to that according to the first embodiment, except that in this embodiment the rotary shaft 10, which has the end face fixed with the magnetic generating element 2, has a portion, inserted into the bearing inner race 21, of a length reduced as compared with that in the first embodiment, as is the case with the previously described second embodiment shown in FIG. 14. In addition, the axial position of an end face portion 27c of the sensor fitting member 27, which defines the position at which the sensor is fitted, is aligned with the collar 27b and the magnetic generating element 2 is fitted to an inner diametric side of the bearing inner race 21 through a fixing member 15 that is separate from the rotary shaft 10. The fixing member 15 is in the form of a disc-shaped member having a peripheral edge portion formed as a cylindrical wall 15a and is fixed on the inner diametric side of the inner race 21 with the cylindrical wall 15a press-fitted into or bonded to an inner diametric surface of the inner race 21. The magnetic generating element 2 is fixed in position at a center location (coaxial with the rotation axis O of the rolling bearing assembly 20) at one surface of the fixing member 15 opposed to the rotation sensor 3.

According to the third embodiment described above, since the axial position of the rotation detecting device 1 is brought closer to the rolling bearing assembly 20 than that according to the embodiment shown in and described with reference to FIG. 1, the bearing assembly with a rotation detection device as a whole can have a reduced axial dimension. In particular, since in this third embodiment, the magnetic generating element 2 is fixed to the fixing member 15 that is separate from the rotary shaft 10, the axial length can be advantageously reduced as compared with the conventional example, while preserving the feature of the conventional example, in which the rotary shaft 10 can be separated from the bearing assembly, leaving the rotation detecting device in the bearing assembly.

Figure 16:
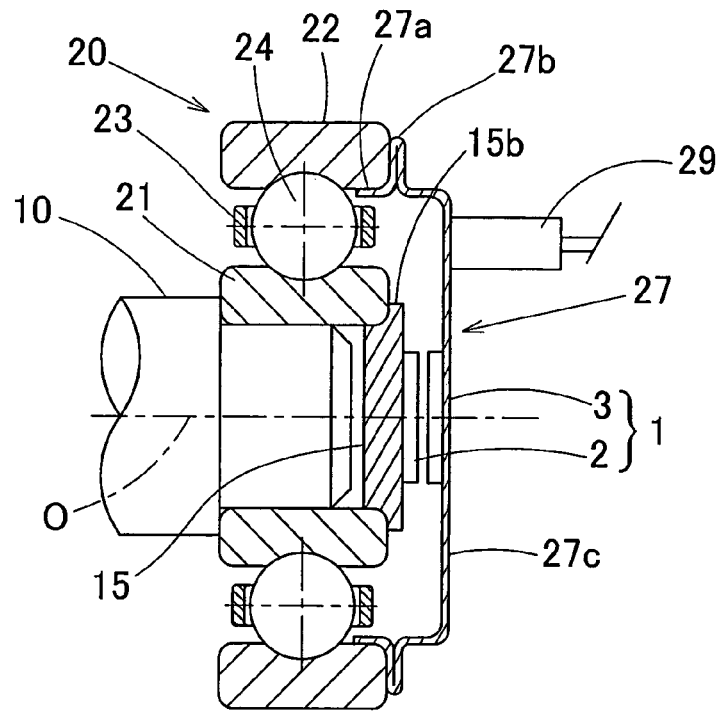
FIG. 16 is a longitudinal sectional view of the bearing assembly with a rotation detection device according to a fourth preferred embodiment of the present invention.

FIG. 16 illustrates a fourth preferred embodiment of the present invention. The bearing assembly with a rotation detection device according to this fourth embodiment is substantially similar to that according to the first embodiment shown in and described with particular reference to FIG. 1, except that in this embodiment, as is the case with the example shown in FIG. 15, the rotary shaft 10, which has the end face fixed with the magnetic generating element 2, has a portion, inserted into the bearing inner race 21, of a length reduced as compared with that in the first embodiment, and the magnetic generating element 2 is fitted to the inner diametric side of the bearing inner race 21 through the fixing member 15 that is separate from the rotary shaft 10. The fixing member 15 is of a disc-shaped configuration having a flange 15b formed in a peripheral edge portion thereof so as to extend radially outwardly from one of the opposite surfaces of such fixing member 15 remote from the rotary shaft 10. A reduced diameter portion of the fixing member 15, which is a non-flanged portion, is press-fitted into an inner diametric surface of the inner race 21 with the flange 15b held in abutment with an annular end face of the bearing inner race 21 adjacent the rotation detecting device, to thereby allow the fixing member 15 to be secured to the inner diametric side of the inner race 21.

According to the above described fourth embodiment of the present invention, the fixing member 15 can be easily positioned in the inner diametric side of the inner race 21 with the end face of the inner race 21 taken as a reference plane. Accordingly, the fixing member 15 can be press-fitted into the inner race 21 so that a fixing surface of the magnetic generating element 2 in the fixing member 15 may lie perpendicular to the rotation axis O of the rolling bearing assembly 20, that is, the magnetic generating element 2 can be held parallel to the rotation sensor 3. Therefore, the parallelism and the clearance between the magnetic generating element 2 and the rotation sensor 3 can be maintained accurately to a predetermined precision. As a result thereof, it is possible to suppress any undesirable variation of the strength of a magnetic field pattern on the surface of the semiconductor chip 4, which would otherwise result from rotation of the magnetic generating element 2. Also, since the clearance referred to above can be made smaller than that in the conventional example, the magnetic field strength to be detected by the rotation sensor increases, accompanied by increase of the S/N ratio. Owing to those two effects, the rotation detecting precision of the rotation detecting device 1 can be increased.

Figure 17:
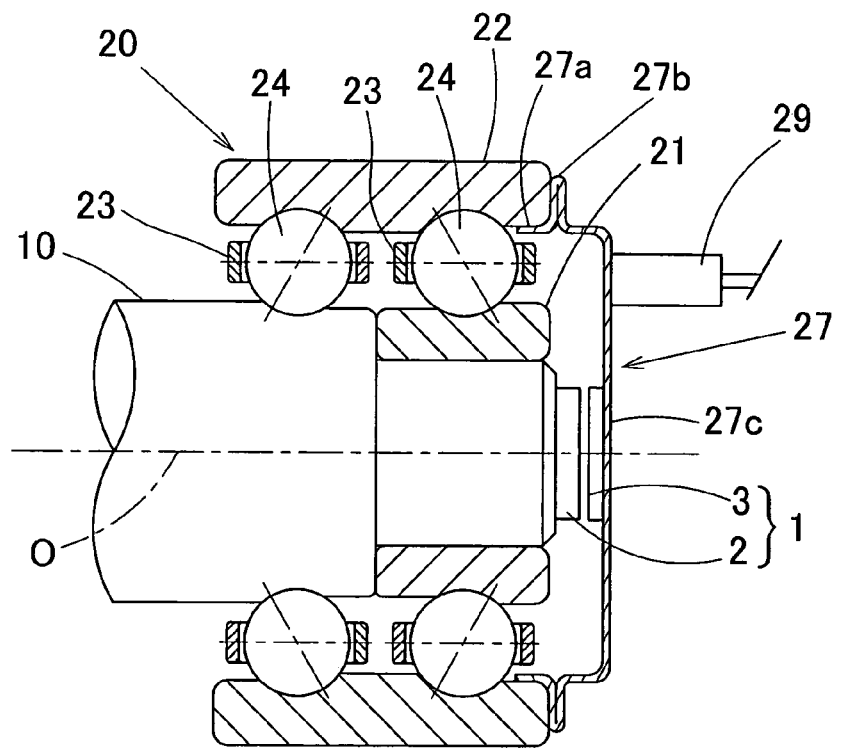
FIG. 17 is a longitudinal sectional view of the bearing assembly with a rotation detection device according to a fifth preferred embodiment of the present invention.

A fifth preferred embodiment of the present invention is shown in FIG. 17. The bearing assembly with a rotation detection device according to this fifth embodiment is substantially similar to that according to the previously described first embodiment, except that in this embodiment, the present invention is applied to the rolling bearing assembly 20 in the form of a double row angular contact ball bearing. In other words, in this rolling bearing assembly 20, one of the double rows of rolling elements 24 are interposed between respective raceways defined in the inner and outer races 21 and 22 while the other of the double rows of the rolling elements 24 are interposed between respective raceways defined in the rotary shaft 10 and the outer race 22. Other structural features of the bearing assembly according to the fifth embodiment are substantially similar to those according to the first embodiment shown in and described with particular reference to FIG. 1.

Figure 18:
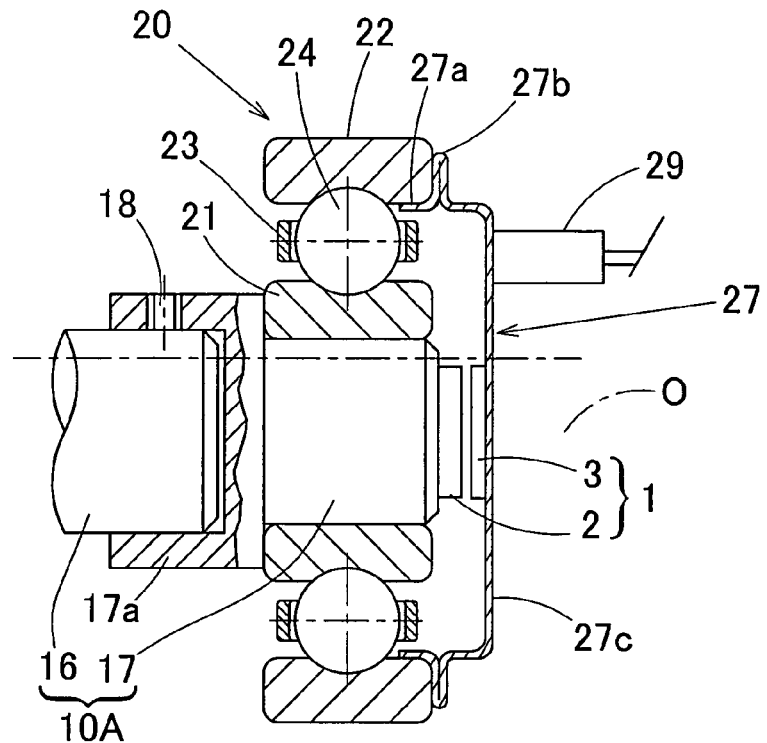
FIG. 18 is a longitudinal sectional view of the bearing assembly with a rotation detection device according to a sixth preferred embodiment of the present invention.

A sixth preferred embodiment of the present invention will now be described with particular reference to FIG. 18. The bearing assembly with a rotation detection device according to this embodiment is substantially similar to that according to the previously described first embodiment, except that in this embodiment, in place of the unitary rotary shaft 10 used in the first embodiment, a rotary shaft assembly 10A of a double staged structure is employed. In other words, the rotary shaft assembly 10A shown in FIG. 18 is made up of a rotary shaft main body 16 and a rotary shaft end body 17 coupled with one end of the rotary shaft main body 16. The rotary shaft main body 16 and the rotary shaft end body 17 are coupled together in such a way that one end of the rotary shaft main body 16 is inserted into a cylindrical portion 17a defined at one end of the rotary shaft end body 17, and a stop member 18 in the form of, for example, a threaded member, is tapped into the rotary shaft main body 16 to prevent a relative rotation therebetween. The rotary shaft end body 17 is in turn inserted into the inner race 21 of the rolling bearing assembly 20 and the magnetic generating element 2 is fixed to an end face of the rotary shaft end body 17. Other structural features of the bearing assembly with a rotation detection device according to the sixth embodiment are substantially similar to those according to the first embodiment shown in and described with particular reference to FIG. 1.

According to the sixth embodiment shown in and described with particular reference to FIG. 18, the rotary shaft main body 16 and the rotary shaft end body 17 are separable from each other and, accordingly, it is possible to separate the bearing assembly with a rotation detection device from the rotary shaft main body 16.

Figure 19:
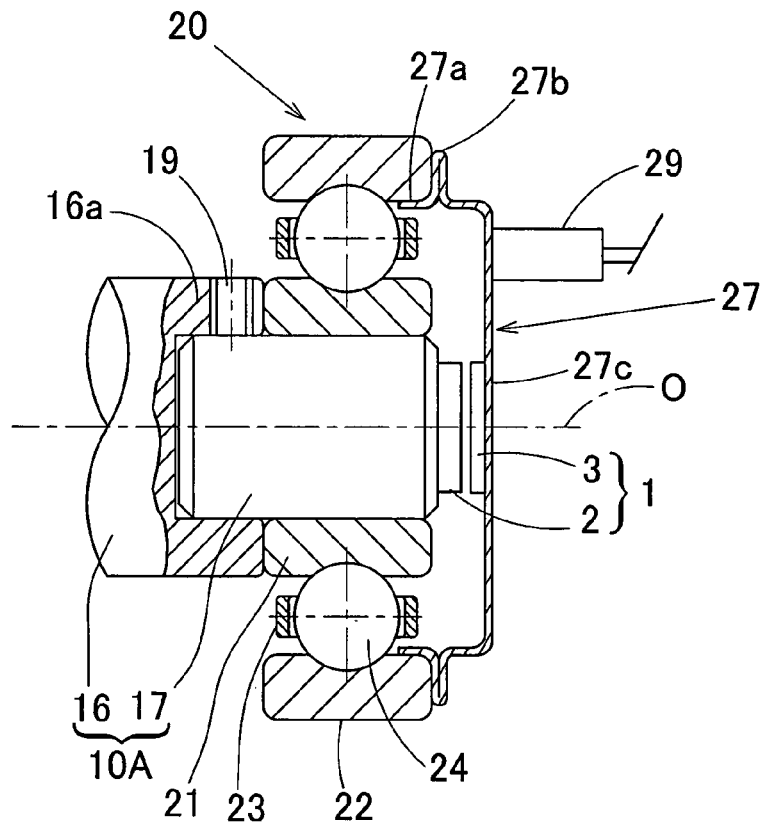
FIG. 19 is a longitudinal sectional view of the bearing assembly with a rotation detection device according to a seventh preferred embodiment of the present invention.

FIG. 19 illustrates a seventh preferred embodiment of the present invention. Even the bearing assembly with a rotation detection device according to this embodiment is substantially similar to that according to the previously described first embodiment, except that in this embodiment, in place of the unitary rotary shaft 10 used in the first embodiment, a rotary shaft assembly 10A is employed. In other words, the rotary shaft assembly 10A shown in FIG. 19 is made up of a rotary shaft main body 16 and a rotary shaft end body 17 coupled with one end of the rotary shaft main body 16. The rotary shaft main body 16 and the rotary shaft end body 17 are coupled together in such a way that one end of the rotary shaft end body 17 is inserted into a cylindrical portion 16a, defined at one end of the rotary shaft main body 16, and a stop member 18 is tapped into the rotary shaft end body 17 to prevent a relative rotation therebetween. Other structural features of the bearing assembly with a rotation detection device according to the seventh embodiment are substantially similar to those according to the sixth embodiment shown in and described with particular reference to FIG. 18.

Figure 20:
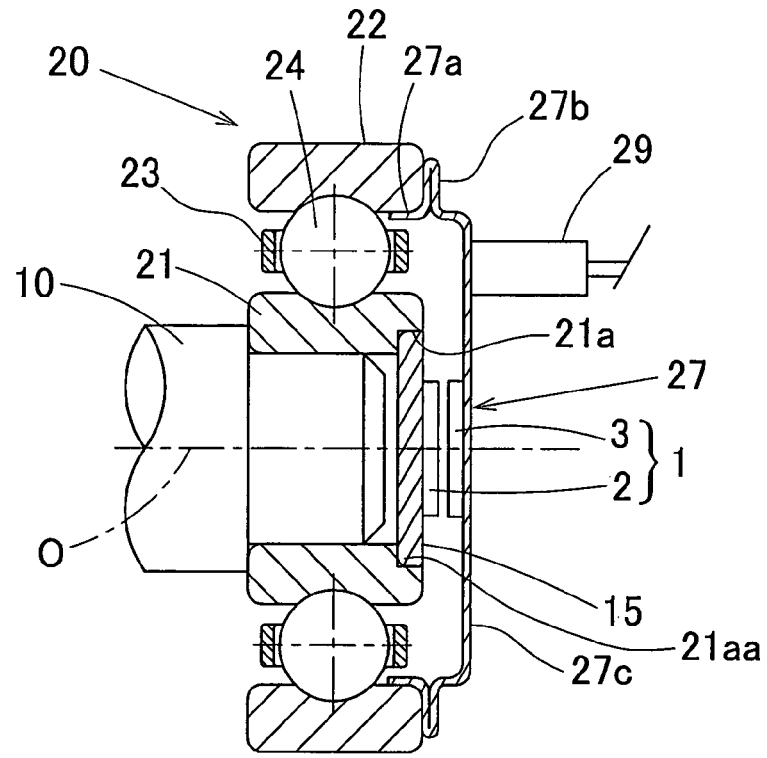
FIG. 20 is a longitudinal sectional view of the bearing assembly with a rotation detection device according to an eighth preferred embodiment of the present invention.

An eighth preferred embodiment of the present invention is shown in FIG. 20. The bearing assembly with a rotation detection device according to this eighth embodiment is substantially similar to that according to the fourth embodiment shown in and described with particular reference to FIG. 16, except that in place of the formation of the flange 15b in the fixing member 15 such as in the fourth embodiment, a portion of the inner race 21 of the rolling bearing assembly 20 adjacent the side, where the rotation detecting device is arranged, has a stepped portion 21a defined therein at an end face inner diametric side and the fixing member 15 is press-fitted into or bonded to this stepped portion 21a to thereby secure the fixing member 15 to the inner race 21. In such case, the fixing member 15 can be axially positioned by taking a stepped face 21aa of the stepped portion 21a in the inner race 21, which is oriented axially, as a reference plane.

According to the eighth embodiment described above, since the fixing member 15 is secured to the inner race 21 with the fixing member 15 press-fitted into or bonded to the stepped portion 21a defined in the inner race 21, as compared with that according to the fourth embodiment, the axial position of the fixing member 15 can be brought close towards the side of the rotary shaft 10 by a distance corresponding substantially to the thickness of the fixing member 15 and, accordingly, the overall axial length of the bearing assembly with a rotation detection device can be reduced.

Figure 21:
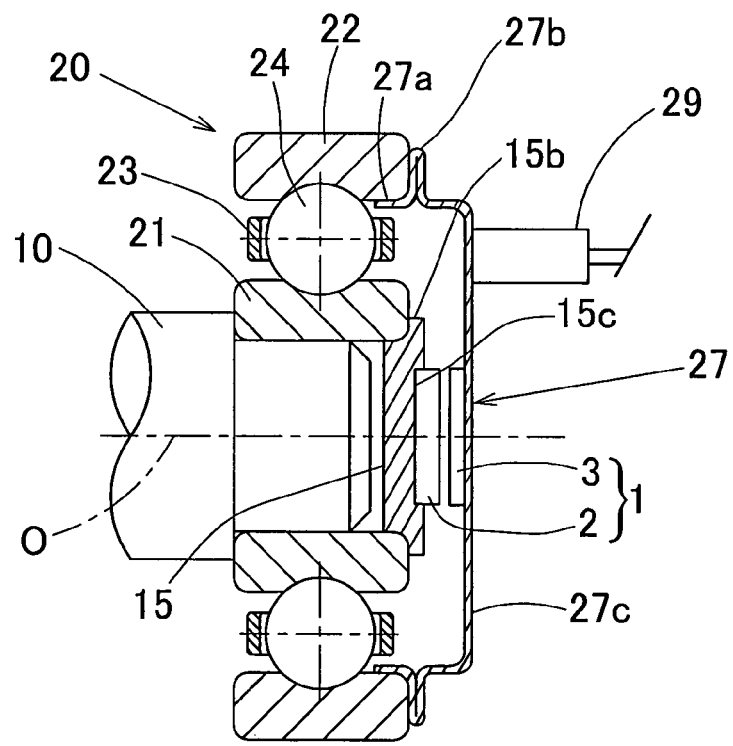
FIG. 21 is a longitudinal sectional view of the bearing assembly with a rotation detection device according to a ninth preferred embodiment of the present invention.

Referring to FIG. 21, there is shown a ninth preferred embodiment of the present invention. The bearing assembly with a rotation detection device according to this ninth embodiment is substantially similar to the fourth embodiment shown in and described with reference to FIG. 16, except that in this embodiment, the coupling structure shown in and described with particular reference to FIG. 10 is employed to secure the magnetic generating element 2 to the fixing member 15. Specifically, the surface of the fixing member 15 confronting the rotation sensor 3 is formed with a recess 15c, and the magnetic generating element (permanent magnet) 2 is fixedly inserted in such recess 15c.

What is claimed is:

1. A bearing assembly with a rotation detection device comprising:
    a magnetic generating element arranged on an inner race side of the bearing assembly and having a directionality about a rotation axis; and
    a rotation sensor fitted to an outer race side in alignment with a bearing axis to detect a magnetism, generated from the magnetic generating element, and to output information descriptive of rotation or angle,
    wherein the magnetic generating element is fixed to a fixing member secured to an inner diametric side of the inner race of the bearing assembly,
    wherein the rotation sensor includes a plurality of magnetic sensor elements and a circuit to convert respective outputs of the magnetic sensor elements into a rotation signal or an angle signal, the magnetic sensor elements and the converting circuit being integrated together,
    wherein the fixing member is a member separate from a shaft and is press-fitted into or bonded to an inner diametric surface of the inner race, and
    wherein the rotation sensor is fitted to a sensor fitting member fitted to the outer race with a collar of the sensor fitting member abutted against an end face of the outer race, and an axial position of an end face portion of the sensor fitting member that defines a position at which the rotation sensor is fitted is aligned with an axial position of the collar.

2. The bearing assembly with a rotation detection device as claimed in claim 1, wherein the fixing member is positioned in abutment against an end face of the inner race or a stepped face defined in the inner race so as to be oriented axially.

3. The bearing assembly with a rotation detection device as claimed in claim 1, wherein the magnetic generating element comprises two permanent magnets each magnetized axially or a single permanent magnet having N-and S-poles defined on one surface thereof.

4. The bearing assembly with a rotation detection device as claimed in claim 3, wherein the fixing member is formed with a recessed pocket defined therein and the permanent magnet or permanent magnets are fixed in the recessed pocket.

5. The bearing assembly with a rotation detection device as claimed in claim 4, wherein the permanent magnet or permanent magnets are encompassed with a flexible material such as a resinous material, which is more flexible than the permanent magnet and the fixing member, and the flexible material is fixed in the recessed pocket together with the permanent magnet or permanent magnets.

6. The bearing assembly with a rotation detection device as claimed in claim 1, wherein the fixing member is made of a non-magnetic material, and further comprising a magnetic yoke interposed between the magnetic generating element and the fixing member.

7. The bearing assembly with a rotation detection device as claimed in claim 1, wherein the rotation sensor is integrated on a semiconductor chip.

8. The bearing assembly with a rotation detection device as claimed in claim 7, wherein the rotation sensor comprises four magnetic line sensors including the magnetic sensor elements arranged along four sides of an imaginary rectangular shape, and further comprising a calculating unit positioned inside the rectangular arrangement of the magnetic line sensors for converting respective sensor outputs of the magnetic line sensors into a rotation information or an angle information.

9. The bearing assembly with a rotation detection device as claimed in claim 7, wherein a plurality of the magnetic sensors positioned inside the rotation sensor is operable to detect a sinusoidal signal and a cosine signal of magnetic fields that rotate with rotation of the magnetic generating element, and further comprising the converting circuit including the calculating unit for converting signals, detected by the magnetic sensors, into a rotation signal or an angle signal.

10. The bearing assembly with a rotation detection device as claimed in claim 1, wherein an axial position of the magnetic generating element is set axially inwardly from a plane of an end face of the inner race.

\* \* \* \* \*

UNITED STATES PATENT AND TRADEMARK OFFICE
CERTIFICATE OF CORRECTION

PATENT NO. : 7,988,363 B2
APPLICATION NO. : 11/884892
DATED : August 2, 2011
INVENTOR(S) : Toru Takahashi et al.

It is certified that error appears in the above-identified patent and that said Letters Patent is hereby corrected as shown below:

First Page Column 1 (PCT No.), Line 1, Delete "PCT/JP2006/002193" and insert --PCT/JP2006/302193--, therefor.

Column 15, Line 7 (Approx.), In Claim 3, delete "N-and" and insert --N- and--, therefor.

Signed and Sealed this
Twenty-fifth Day of October, 2011

David J. Kappos
*Director of the United States Patent and Trademark Office*